United States Patent Office 2,960,699
Patented Nov. 22, 1960

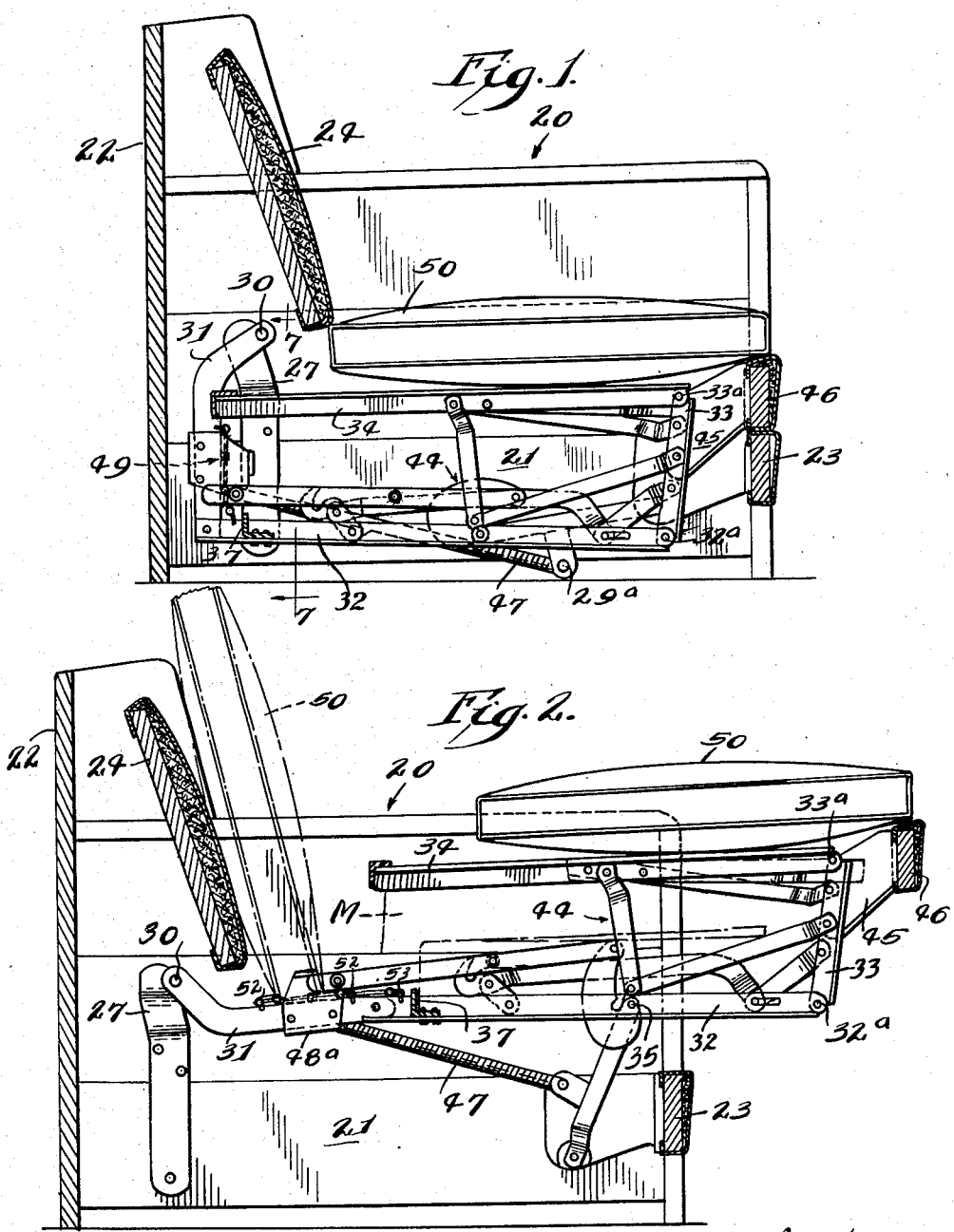

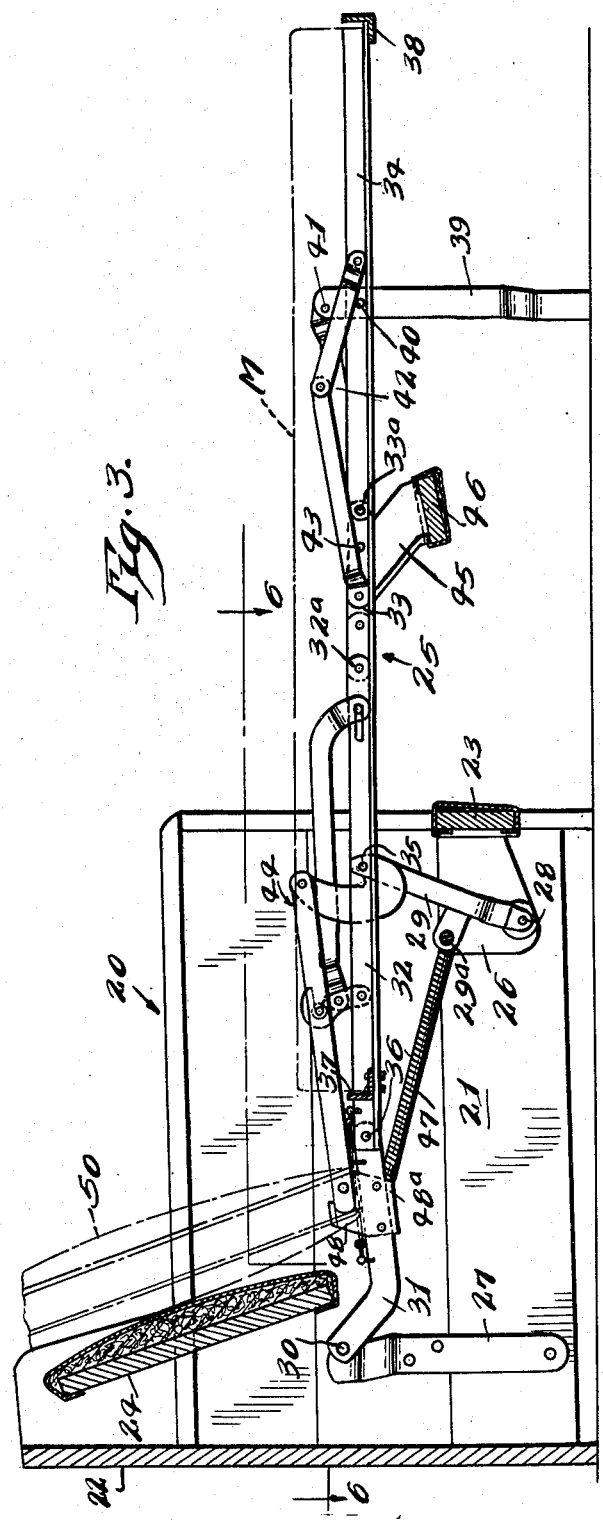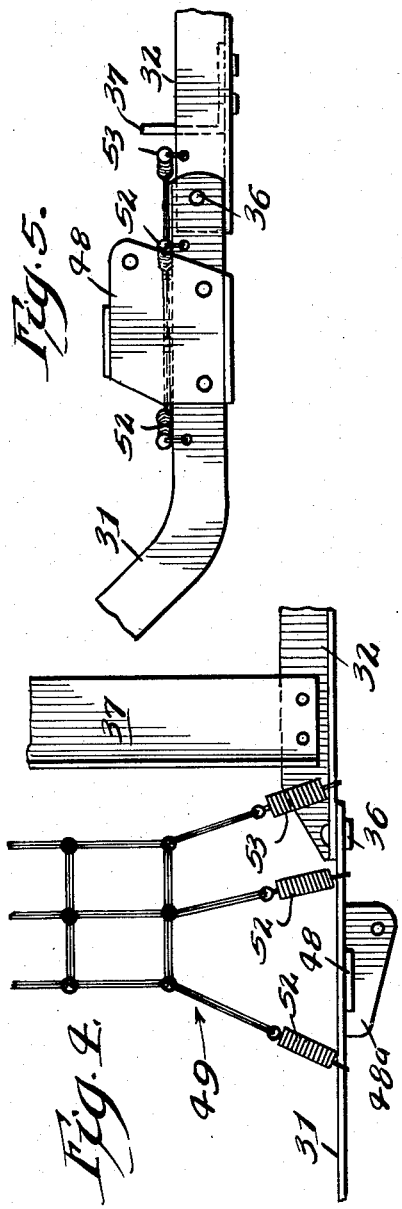
Inventors.
Martin Fox,
Charles O. Buher

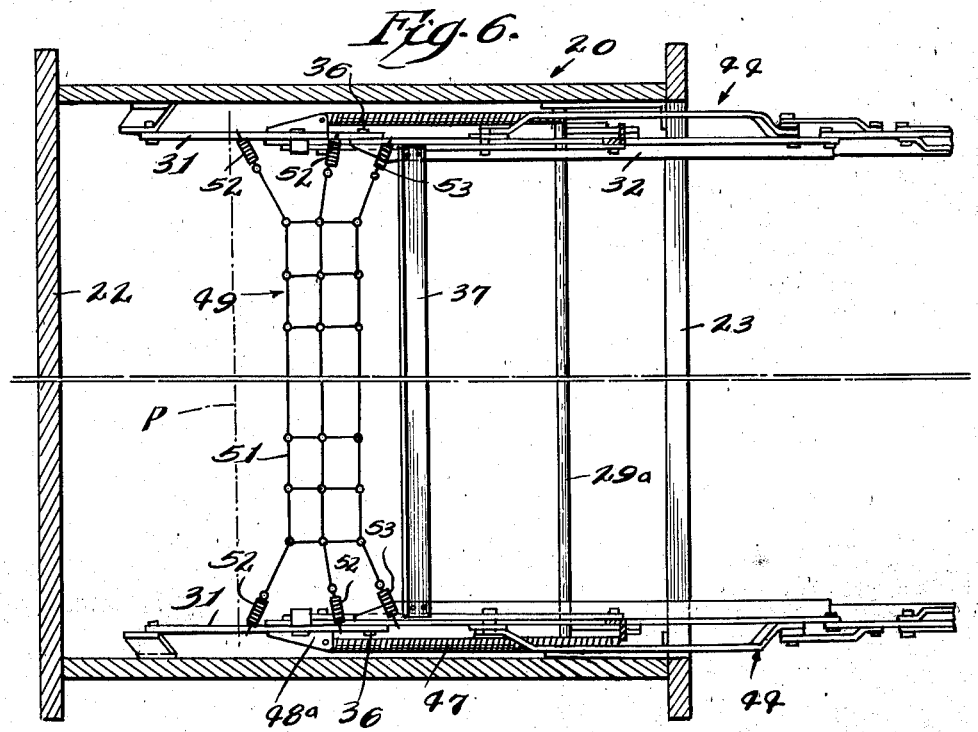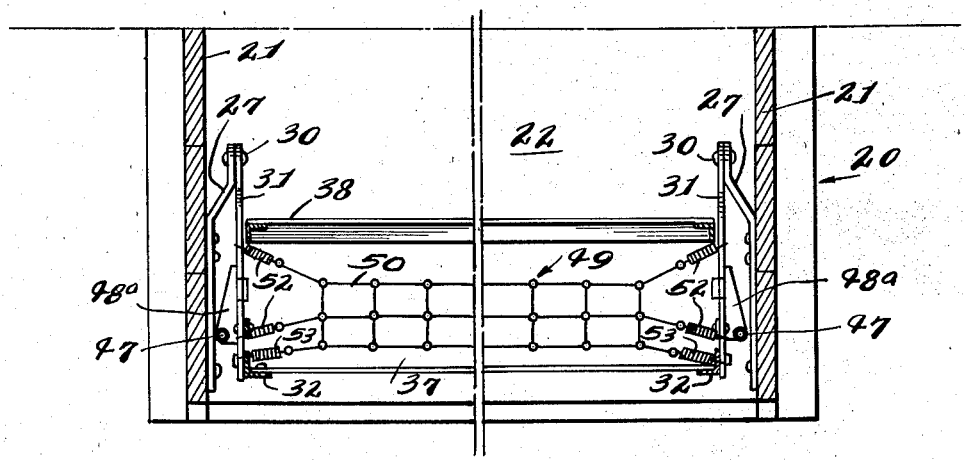

2,960,699
DAVENPORT BED

Martin Fox, Chicago, and Charles O. Buher, Wheaton, Ill., assignors to The Seng Company, a corporation of Illinois Filed Jan. 12, 1959, Ser. No. 786,389

3 Claims. (Cl. 5—13)

This invention relates to a convertible davenport bed, and in particular it relates to a davenport bed which is provided with means mounted on the support for the folding bed bottom upon which the loose seat cushions may be supported when the bed bottom is in bed position.

Modern davenport beds are commonly provided with loose seat cushions which, in davenport position, are supported upon one of the folded sections of the bed bottom which thus serves as a seat deck. When the bed bottom is unfolded, the loose cushions must be removed and placed on the floor, or stored on a chair. Thus, the disposition of the loose cushions creates a problem for a housewife or other user of a davenport bed when the unit is unfolded for use as a bed.

The problem of storing the loose cushions is aggravated in those davenport beds which have the head and foot of the bed bottom between the arms of the davenport frame, so that the inside length of the frame is greater than that of the bed. Modern furniture styling has resulted in the manufacture of such davenport beds in which there are only two loose cushions occupying the entire span of nearly seven feet between the arms of the davenport frame, and in some cases only a single loose cushion is used. It is obvious that the overnight storage of a six and a half to seven foot davenport cushion, or even a pair of forty inch cushions, is a deterrent to the sale of such devices. A single six and a half foot cushion is quite a load for the average woman to handle even if she has a convenient place to store it.

In accordance with the present invention the pivoted supporting arms which are mounted behind the fixed back frame, and which extend forward of the back frame in bed position of the folding bed bottom, are provided with cushion supporting means which has its two ends secured to said arms. When the bed bottom is extended to bed position, the cushion supporting means is located forward of the padded back frame but to the rear of the rearmost part of the bed frame; so that the loose seat cushion may stand on edge on the cushion support, leaning against the padded back frame.

Most present day folding bed bottoms unfold in two steps. In the first step the three sections of the bed bottom which are more remote from the back of the davenport frame in bed position swing upwardly and outwardly to an intermediate position with no more than a slight relative movement between the sections. In intermediate position the rear mounting arms swing outwardly; and the cushion supporting means of the present invention is thus located in the same position which it occupies after the bed sections are unfolded. Accordingly, the bed bottom may be swung to intermediate position without removing the loose seat cushion or cushions, and the latter may then be slid off the rear of the seat deck and tipped onto the cushion supporting means to lean against the padded back frame. The bed bottom may then be folded the rest of the way.

In davenport position, where the folding bed bottom is of the type which extends lengthwise between the arms of the davenport frame, the pivoted rear supporting arms are upright behind the folded bed bottom, and the cushion supporting means closes the normal space at the rear of the folded bed bottom so as to also serve as a mattress stop.

The invention is illustrated in a preferred embodiment in the accompanying drawings in which:

Fig. 1 is a sectional view of a davenport bed embodying the invention, with the bed bottom folded and a loose seat cushion in place;

Fig. 2 is a view similar to Fig. 1 with the bed bottom in intermediate position, the loose cushion being shown in full lines in its normal position and in broken lines in its stored position;

Fig. 3 is a view similar to Figs. 1 and 2 with the bed bottom in bed position and the loose cushion in stored position;

Fig. 4 is a fragmentary plan view on an enlarged scale showing one end of the cushion supporting means;

Fig. 5 is a fragmentary side elevational view of a rear supporting arm, the adjacent part of the folding bed bottom, and the cushion supporting means;

Fig. 6 is a fragmentary section view taken substantially along the line 6—6 of Fig. 3; and Fig. 7 is a fragmentary section taken substantially as illustrated along the line 7—7 of Fig. 1.

Referring to the drawings in greater detail, a davenport frame, indicated generally as 20, includes a pair of end frame members such as the end frame member 21 seen in the drawings, a back panel 22, a front rail 23 and a padded back rest 24. In the finished unit the frame is upholstered in the usual way. Mounted in the davenport frame 20 is a folding bed bottom mechanism, indicated generally as 25. Preferably the folding bed bottom 25 is a prefabricated unitary structure which may be purchased by a furniture manufacturer for mounting in the davenport frame 20.

The folding bed bottom 25 includes two identical sets of mounting brackets and supporting links which are adapted to be secured to the two end rails 21 of the davenport frame. Since the mounting brackets and supporting links at the two ends of the davenport frame are identical, only one set is described in detail; and similarly a single set of bed end rails and operating linkages for the bed bottom will be described, although there are identical sets of rails and linkages at the two ends of the davenport frame.

Mounting elements for the bed bottom include a front angle bracket 26 which is adapted to be secured to the front rail 23 and end frame member 21, and an upright rear mounting bracket 27. Pivotally connected to the angle member 26 at 28 is a forward supporting arm 29, while pivotally connected to the upright bracket 27 at 30 is a rear suspension arm 31.

The folding bed bottom itself consists of three articulated bed sections including an inner bed section 32, an intermediate bed section 33 hingedly connected to the section 32 at 32a, and an outer bed section 34 hingedly connected to the intermediate bed section at 33a; so that the sections 32 and 34 may be considered flanking sections, and the section 33 may be considered a connecting section. The foldable bed bottom is mounted on the supporting arms 29 and 31 by means of pivots 35 and 36, respectively. The bed bottom also includes a longitudinally extending inner side rail 37 which is effectively a part of the bed section 32 and in the bed position of Figs. 3 and 6 is forward of a vertical plane p through the most forward part of the back rest 24; and an outer side rail 38 which is effectively a part of the outer bed section 34. The davenport bed here disclosed extends longitudinally within the sofa frame, so that the head of the bed is adjacent one end of the sofa frame and the foot of the bed is adjacent the other end. Thus, the inner rail 37 constitutes one side rail of the bed and the outer rail 38 the other side rail of the bed.

The bed bottom also includes a suitable flexible spring structure (not shown) upon which is supported a conventional inner-spring or foam rubber mattress M, the position of which on the bed is indicated in broken lines.

As best seen in Fig. 3 the outer bed section 34 is provided with a folding leg 39 which is pivotally connected to the outer bed section 34 at 40, and a pivot 41 on the leg above the pivot 40 is connected to one end of a leg folding link 42 which, as best seen in Fig. 3, is pivotally connected to the intermediate bed section 33 at 43. Thus, when the bed bottom is folded from the extended bed position of Fig. 3 to the intermediate position of Fig. 2 the movement of the link folds the leg 39 as shown.

The bed bottom is provided with a section locking mechanism, indicated generally at 44, for locking the three bed sections in fixed relationship in davenport position, as seen in Fig. 1. The structure and operation of mechanism 44 is identical with that in Fox Patent 2,803,-019, and is not described in detail here.

The bed bottom structure is completed by a pair of brackets 45 on intermediate bed section 33 to carry a front trim board 46, which is seen in Fig. 1 to rest immediately above the front frame member 23 of the davenport frame in davenport position. The bracket 45 and front trim board 46 provide stiffening for the bed frame between the side rails 37 and 38. Counterbalancing springs 47 for aiding in the folding and unfolding of the bed bottom are stretched between a torque rod 29a on the forward supporting arms 29 and a spring flange 48a on a bracket 48 on rear support arm 31.

The mechanism as heretofore described is entirely in accordance with Fox Patent 2,803,019, previously identified. The new part of the combination consists of a supporting means, indicated generally at 49, on which a loose seat cushion 50 is stored when the bed bottom is unfolded as seen in Fig. 3.

As best seen in Figs. 4 to 7 inclusive, cushion supporting means 49 consisting of a narrow section of conventional mattress supporting wire fabric 51 is secured to rear suspension arms 31 by coil tension springs 52. There are also springs 53 hooked into holes in the inner bed frame section 32 immediately adjacent the pivot 36 between said section and rear suspension arms 31.

As seen in Fig. 6, when the folding bed bottom is in bed position, the loose cushion supporting means 49 is immediately adjacent the inner rail 37 of the bed frame, and as seen in Fig. 3 in this position the loose cushion 50 may rest upon cushion support 49 and lean against padded back 24 of the davenport frame.

As seen in Fig. 2, handling of the loose cushion 50 is reduced to a minimum because of the fact that the bed bottom may be moved to its intermediate position without first removing the loose cushion from it, and when the bed bottom is in this position the loose cushion may be pushed to the rear of the seat deck and tipped off the back to the stored position which is seen in broken lines in Fig. 2.

The position of cushion supporting means 49 in the davenport position of the folding bed bottom is illustrated in Fig. 7. As seen in this view, the cushion supporting means occupies most of the open space to the rear of inner bed section 32 and outer bed section 34, and thus serves as a mattress stop to prevent the mattress from sliding rearwardly as the bed bottom is moved into its davenport position in the sofa frame.

The foregoing detailed description is given for clearness of understanding only and no unnecessary limitations are to be understood therefrom, as some modifications will be obvious to those skilled in the art.

We claim:

1. In a convertible davenport bed: a base frame with a fixed back; a pair of front arms pivoted near the front of the frame; a pair of rear arms pivoted on the frame to the rear of the back for movement between a depending retracted position and a forwardly extended position with their free ends forward of the back; a folding bed bottom pivotally connected to said front arms and to the free ends of said rear arms for movement between a folded, retracted davenport position in which part of the bed bottom supports a loose seat cushion, and a forwardly extended bed position, said bed bottom having a rail extending between the free ends of the rear arms, said rail defining the rearmost portion of the bed bottom and in bed position being forward of a vertical plane through the most forward part of the back; and cushion supporting means independent of the base frame and located to the rear of the bed frame, the ends of said supporting means being secured to the rear arms so that in bed position said supporting means is between said rail and said plane to support a loose seat cushion which is in an upright position behind the bed frame and leaning against the fixed back.

2. The device of claim 1 in which the bed bottom includes flanking sections of substantial depth which are substantially parallel in davenport position, the rail between the free ends of the rear arms forming the side of one of said flanking sections and the other flanking section supporting the loose seat cushion in davenport position, and a short connecting section pivoted to said flanking sections and standing upright at the front of the frame in davenport position, the head and foot of the bed bottom being defined by the ends of said flanking section and said connecting section, and the cushion supporting means being upright between the rearmost parts of said flanking sections in said position to provide a mattress stop.

3. The device of claim 1 in which the cushion supporting means comprises a wire mesh and helical tension springs connecting the two ends of the wire mesh to the rear arms.

References Cited in the file of this patent

UNITED STATES PATENTS

| | | |
|---|---|---|
| 1,351,011 | Brilliant | Aug. 24, 1920 |
| 2,345,624 | Paladino | Apr. 4, 1944 |
| 2,584,145 | Martin | Feb. 5, 1952 |
| 2,803,019 | Fox | Aug. 20, 1957 |